A. A. TIRRILL.
ELECTRICAL REGULATOR.
APPLICATION FILED JAN. 5, 1915.

1,216,518.

Patented Feb. 20, 1917.

WITNESSES:
R. J. Ridge.
Otto S. Schairer.

INVENTOR
Allen A. Tirrill.
BY
Wesley G. Carr
ATTORNEY

UNITED STATES PATENT OFFICE.

ALLEN A. TIRRILL, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL REGULATOR.

1,216,518. Specification of Letters Patent. Patented Feb. 20, 1917.

Application filed January 5, 1915. Serial No. 565.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Electrical Regulators, of which the following is a specification.

My invention relates to electrical regulators and particularly to those in which the regulation is effected by opening and closing a shunt circuit to a resistance in series with the field magnet winding of an exciter or other dynamo-electric machine.

The object of my invention is to provide a regulator of the character indicated that shall be effective and reliable in operation, and capable of maintaining the voltage or other electrical quantity of a circuit substantially constant in value and of promptly and accurately restoring it to its normal value following a change of load upon, or other disturbance of, a system.

The present invention is an improvement over that set forth in my application, Serial No. 822,134, filed Mar. 3, 1914, the improvement consisting in the provision of mechanical means for assisting in preventing hunting and in causing the regulator to be more promptly restored to a condition of stability or equilibrium.

Figure 1:
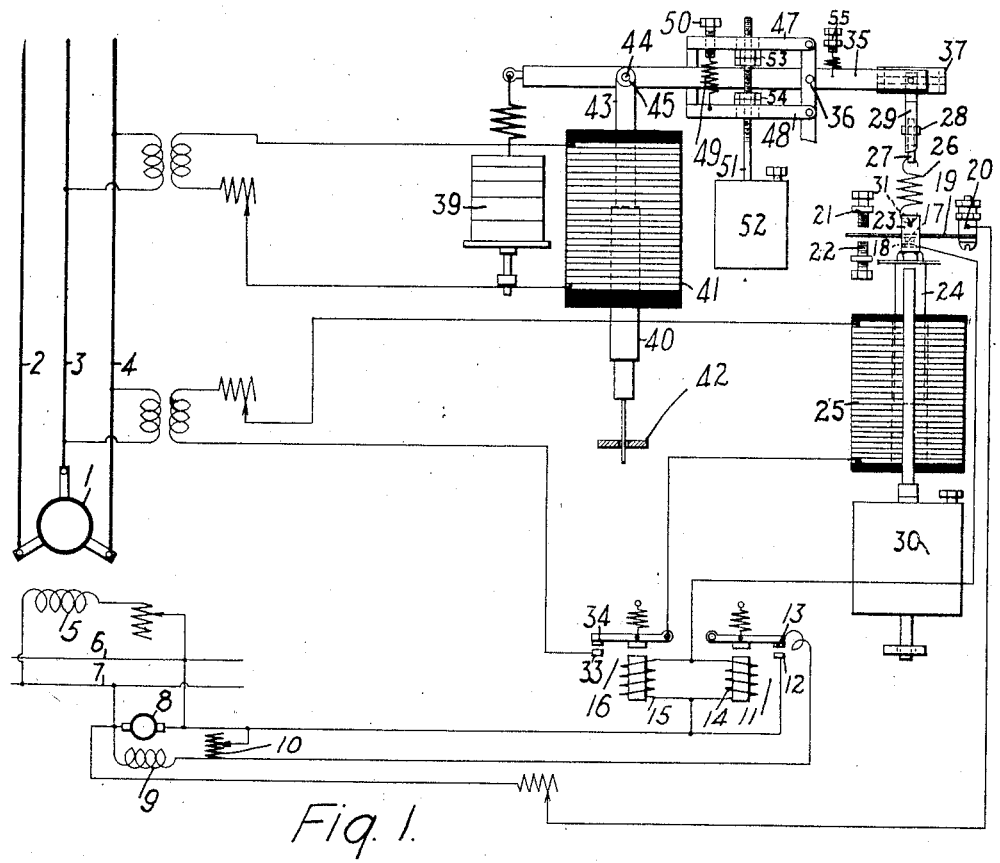
Figure 2:
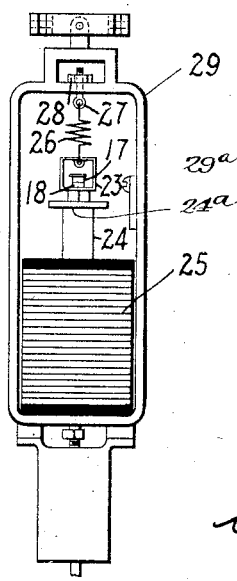
Figure 3:
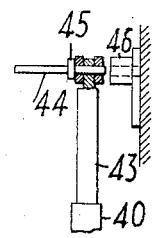

My invention is illustrated in the accompanying drawing, Figure 1 of which is a side view of the main controlling element of the regulator, the circuit connections being illustrated diagrammatically. Fig. 2 is an end view of the main controlling element of the regulator, and Fig. 3 is a side and sectional view of some of the parts of the regulator.

A system in connection with which the regulator may be conveniently employed comprises a generator 1 that supplies current to a suitable distributing circuit 2—3—4 and the field magnet winding 5 of which is supplied from exciter bus bars 6—7. An exciter 8 that is connected to the bus bars 6—7 is provided with a field magnet winding 9 in series with which is a suitable variable resistor 10, the effective value of which is determined by opening and closing a shunt circuit thereto by means of a relay 11 having coöperating stationary and movable members 12 and 13, respectively, that are connected to the terminals of the resistor 10. The relay 11 is provided with an energizing winding 14 that is connected in parallel with an energizing winding 15 of a similar relay 16, both of said windings being supplied with current from the exciter or from any other suitable source.

The circuit of the windings 14 and 15 is controlled by a pair of coöperating contact terminals 17 and 18, the former of which is mounted upon a plate spring 19 intermediate its ends. One end of the spring 19 is clamped in a stationary post 20, and the other end extends between two screws 21 and 22, serving as adjustable means for limiting the movements of the contact terminal 17. The contact terminal 18 is mounted upon the upper face of the lower cross-piece of a small yoke 23 that is carried by the core member 24 of an electro-magnet having an energizing winding 25. The upper end or cross-piece of the yoke is connected to the lower end of a helical tension spring 26, the upper end of which is connected to an eye bolt 27 having a nut 28 for adjusting the tension of the spring. The eye-bolt 27 passes through the upper end of a rectangular frame 29 that surrounds and supports the electromagnet 25 and its associated parts. The movements of the solenoid core 24 and of the contact member 18 are retarded by means of a dash pot 30 that is secured to the lower end of the frame 29, and their movements are also limited by reason of the engagement of a boss or projection 31, that is provided upon the lower face of the upper cross-piece of the yoke 23, with the upper face of the plate spring 19 that carries the contact terminal 17. The coil 25 receives current from the distributing circuit 2—3—4, though it may receive current from any other suitable source, and its circuit is controlled by coöperating stationary and movable contact terminals 33 and 34, respectively, of the relay 16.

Upon the upper end of the core member 24 is a laterally extending cap or end piece 24ª, and, secured to one side of the frame 29 adjacent to the said end piece is a magnetizable plate 29ª that is adjustable vertically of the frame to vary its effect upon the core member. When the coil 25 is energized, the core 24 is attracted slightly toward the plate, and the contact terminals 17 and 18 are brought together with a rubbing action, thereby insuring good electrical contact between them and keeping them clean.

The frame 29 is suspended from a lever 35 that is fulcrumed in a stationary bracket 36, the said lever and frame being operatively connected by means of a universal joint comprising a yoke 37 that is pivotally connected both to the lever 35 and to the upper end of the frame 29, the pivotal axes intersecting each other at substantially right angles. The object of employing a universal joint is to permit of free suspension of the frame 29 and the parts carried thereby, in order that binding of joints, and consequent friction and inaccuracy of operation, may be avoided.

The end of the lever 35 opposite to that to which the frame 29 is connected carries an adjustable counterweight 39, that is resiliently suspended therefrom, and the core member 40 of an electromagnet having an energizing winding 41, the core member being guided in its movements and prevented from swinging by means of a guide 42. The coil 41 receives current proportional to the voltage of the distributing circuit 2—3—4, and, accordingly, varies the positions of the lever 35 and of the frame 29 in accordance with the said voltage. However, if desired, the coil 41 may be caused to vary the positions of said parts in accordance with any other desired electrical condition. In thus varying the position of the frame 29, the position of the contact terminal 18 with respect to the terminal 17 is likewise varied, so that the initial distance between the said contact terminals, that is, the distance which would exist between them, if the winding 25 were not energized, is varied in accordance with the voltage or other selected electrical condition of the distributing circuit.

The core member 40 for the solenoid 41 is suspended from the lever 35 by means of a non-magnetizable rod 43 having an aperture in its upper end to receive a pivot pin 44 that is provided with a washer or shoulder 45 located somewhat nearer one end than the other. Behind the lever 35 adjacent to the pivotal connection between the said lever and the rod 43, is a bracket 46 that is apertured to receive the pivot pin 44. During normal operation of the regulator, the pivot pin 44 occupies the position shown, but in order to facilitate adjustment of the regulator prior to placing it in operation, the pivot pin 44 is withdrawn and its longer end inserted through the lever 35 and into the aperture in the bracket 46. The position of the lever 35 is thereby fixed and the adjustment of the spring 26, of the stops 21 and 22, and of the other parts of the regulator carried by the frame 29, may be readily effected.

The lever 35 is engaged upon opposite sides by the ends of two levers 47 and 48 that are pivoted in the bracket 36, preferably respectively above and below the pivot of the lever 35. The said levers are connected by a helical tension spring 49, the tension of which may be regulated by an adjusting screw 50, but they may be connected by any other suitable resilient means. Extending through or adjacent to the levers 47 and 48 is a rod or stem 51 that is connected to the piston or movable member of a dash pot 52, and that is threaded at its upper end for the reception of nuts 53 and 54 that serve as shoulders for engagement with the levers 47 and 48 whereby the levers may actuate the movable member of the dash pot. The movable member of the dash pot is, by this means, resiliently connected to the lever 35 and only indirectly retards the movements of the lever. The lever 35 is thus permitted to move somewhat independently, and in advance, of the dash pot piston, and, accordingly, it can respond more promptly to changes in voltage than it otherwise could, while, at the same time, the dash pot serves to prevent extreme fluctuations and hunting.

A suitable spring 55, the tension of which may be regulated, may also be employed, if desired, for effecting fine adjustment of the voltage value which the regulator tends to maintain.

If, in the operation of the regulator, the load upon the circuit 2—3—4 increases to such an amount as to cause the voltage of the circuit to decrease, the coil 41 will be energized to a somewhat less degree, and the frame 29 will consequently be raised slightly, with the result that the contact terminal 18 will be brought closer to, or into engagement with, the terminal 17. Upon engagement of the said contact terminals, the circuit of the relay windings 14 and 15 is established, and the contact terminals of the relays are caused to engage. Engagement of the contact terminals 12 and 13 establishes a shunt to the resistor 10, and the voltages of the exciter and generator are correspondingly increased to compensate for the decreased voltage resulting from the increase of load. Engagement of the contact terminals 33 and 34 establishes the circuit of the coil 25, which thereupon attracts its core 24 and causes separation of the contact terminals 17 and 18. Upon the interruption of the circuit of the coils 14 and 15, which is thus effected, the contact terminals of the relays disengage and the shunt circuit is again established to the resistor 10, while the circuit of the coil 25 is again interrupted.

The coil 25 is thus alternately energized and deënergized and serves to vibrate the contact terminals 17 and 18 into and out of engagement, while the coil 41 serves to vary the position of the contact terminal 18 with respect to the terminal 17 so that the said terminals will engage and disengage for varying periods dependent upon the voltage of the circuit 2—3—4. The arrangement is such that the resistor 10 is shunted for a greater average period when there is a tendency for the voltage of the circuit 2—3—4 to be reduced, and for a shorter average period when tendency is toward a higher voltage, with the result that the voltage of the distributing circuit is maintained substantially uniform.

By reason of the fact that the movable member of the dash pot 52 is resiliently connected to the lever 35, the lever may move promptly in response to voltage variations. In doing so, however, it subjects the spring 49 to tension, and the spring then causes the dash pot piston to follow the movement. The adjustment of the spring and of the dash pot are such that, when the lever 35 is moved by a voltage change caused by an increase or decrease of load, the movable member of the dash pot will follow only to approximately a position corresponding to the correct position for the lever for normal voltage at that load, the lever returning to that position due to the change of voltage caused by its first movement. For instance, if the voltage increases, the left-hand end of the lever is raised and causes distention of the spring 49 and the exertion of an upward pull on the dash pot stem 51. The dash pot retards the movement of the lever 35, but its piston does not move as far as the lever, because the lever begins its return or downward movement, due to the change of voltage caused by its upward movement, before it has had time to do so.

I claim as my invention:

An electrical regulator comprising co-operating contact members, a lever for actuating one of said members, an electromagnet for actuating the lever, members engaging opposite sides of the lever, a resilient connection between said members, and a retarding device actuated by said members.

In testimony whereof, I have hereunto subscribed my name this 24th day of Dec., 1914.

ALLEN A. TIRRILL.

Witnesses:
OTTO S. SCHAIRER,
B. B. HINES.